Dec. 31, 1968   R. F. GILDART   3,419,182
REINFORCED MILK CRATE
Original Filed Feb. 28, 1966

INVENTOR
RICHARD F. GILDART

BY *Browne, Schuyler, & Beveridge*

ATTORNEYS

United States Patent Office 3,419,182
Patented Dec. 31, 1968

3,419,182
REINFORCED MILK CRATE
Richard F. Gildart, Montebello, Calif., assignor to Rehrig Pacific Company, Los Angeles, Calif., a corporation of California
Continuation of application Ser. No. 530,467, Feb. 28, 1966. This application June 2, 1967, Ser. No. 643,289
9 Claims. (Cl. 220—73)

ABSTRACT OF THE DISCLOSURE

This invention is to a plastic bottle crate with integral reinforced sides and a non-integral metallic ring held by two integral flanges at the top of the crate.

This invention is a continuation of application Ser. No. 530,467 filed Feb. 28, 1966, now abandoned and relates to crates, and more particularly to crates molded from a synthetic resins material and having a reinforced open top.

It is well known to form material or article handling crates from synthetic resin materials, hereinafter referred to broadly as plastic. However, the inherent flexibility of the plastic materials employed to mold crates used for handling relatively heavy articles, such as filled milk bottles, has made it necessary to reinforce the plastic adjacent the open top of the crate. Although numerous arrangements have been devised for reinforcing the top of such crates, these arrangements have not been entirely satisfactory. Accordingly, the primary object of this invention is to provide an improved reinforced molded plastic milk crate.

In the attainment of the foregoing and other objects, an important feature of the invention resides in providing a molded plastic milk crate with an outwardly projecting flange integrally molded around the open top of the crate, and positioning an endless metallic reinforcing rod member around the outer periphery of the crate immediately below the flange. The flange is molded with a plurality of openings extending vertically therethrough adjacent each side wall of the crate, and the reinforcing rod member is provided with a number of upwardly projecting tabs integrally formed on its upper edge in a position to project into the openings of the flange. This interlocking arrangement between the reinforcing rod and the flange positively prevents the side walls of the crate from deflecting inwardly away from the reinforcing rod. Preferably, the reinforcing rod member is pre-formed and installed on the crate immediately after molding while the plastic material is sufficiently warm and flexible to permit the rod member to be installed over the flange without permanently deforming the flange.

Other objects and advantages will become apparent from the following specification taken with the accompanying drawings in which.

Figure 1:
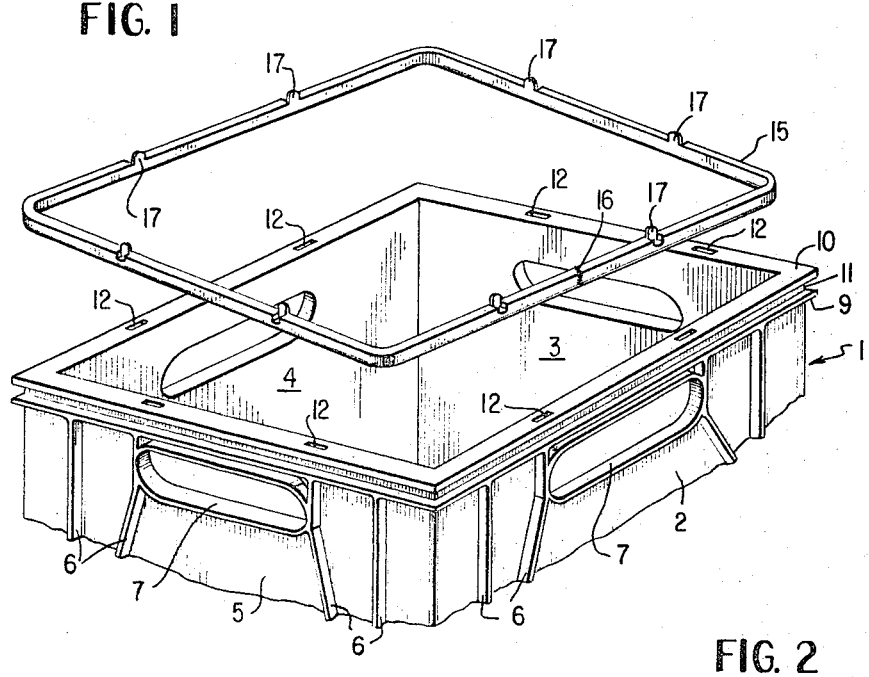
FIG. 1 is a perspective view of the top portion of a molded plastic crate according to the present invention, with the reinforcing ring in position to be installed on the crate.

Referring now to the drawings in detail, a reinforced plastic milk crate according to the present invention is indicated generally by the reference numeral 1, and is shown having four integrally molded, vertically extending side panels indicated by the reference numerals 2, 3, 4 and 5, respectively. The vertical side panels may be formed with a plurality of reinforcing, or stiffening ribs 6, as desired, and a handle 7 may be formed in the respective side panels in the conventional manner.

As illustrated in FIG. 1, the horizontal cross-section of the crate is substantially rectangular, and a pair of vrtically spaced, integrally formed flanges 9 and 10 are formed around the outer periphery of the crate, forming an outwardly directed C-shaped channel 11 around the periphery of the crate adjacent its open top. A plurality of generally rectangular openings 12 extend vertically through the uppermost flange 10 at spaced intervals therealong. At least one, and preferably 2 or more of the openings 12 are positioned intermediate the vertical side edges of each of the respective side panels.

Figure 4:
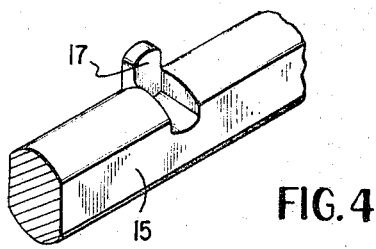
FIG. 4 is an enlarged perspective view of a portion of the reinforcing rod member showing one of the tabs formed thereon.

An endless metallic reinforcing rod member 15 is formed from a length of a steel rod shaped into a generally rectangular configuration and has its adjoining ends welded as at 16 to form a closed ring. The inner periphery of the rod member 15 is substantially equal to and is shaped to conform to the outer periphery of crate 1 within channel 11. A plurality of tabs 17 are integrally formed on and project upwardly from the upper portion of rod 15. Preferably tabs 17 are formed by coining a portion of the material from the upper portion of the steel rod member 15 as shown in FIG. 4. The coined tabs 17 have a generally rectangular cross section corresponding generally to the rectangular shape and size of the openings 12 in flange 10.

Figure 2:
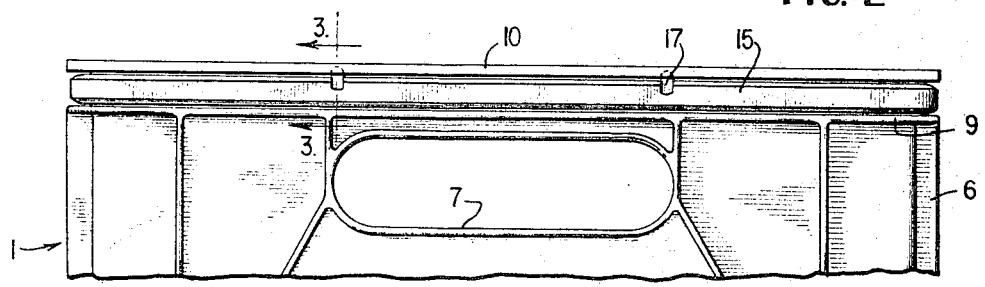
FIG. 2 is an elevation view of the top portion of the reinforced crate according to the present invention.
Figure 3:
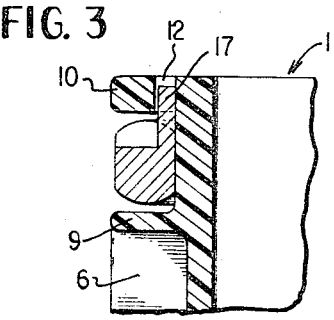
FIG. 3 is a fragmentary sectional view taken on line 3—3 of FIG. 2.

The steel reinforcing rod member 15 is installed on crate 1 within channel 11 with the tabs 17 projecting upwardly into the openings 12 as illustrated in FIGS. 2 and 3. Also, as seen in FIG. 3, the vertical spacing of flanges 9 and 10 is less than the combined vertical dimension of the rod member 15 and tabs 17 so that, once the rod member is installed on the crate, the tabs 17 projecting into openings 12 of flange 10 firmly interlock the top portion of the crate to the re-enforcing rod.

The molded plastic portion of the crate and the steel reinforcing rod member are separately formed and subsequently assembled. However, since the inner periphery of the reinforcing rod number 15 is less than the outer periphery of flange 10, and further since the vertical spacing of flanges 9 and 10 is less than the height of the reinforcing rod 15 and the tab 17, it is necessary to deform the molded plastic portion of the crate to assemble the two elements. Preferably this is accomplished soon after the molded plastic portion is removed from the injection mold, and while the plastic material is still sufficiently pliable to permit deflection without causing permanent distortion. The plastic is then allowed to cool and harden to form a firmly interlocked assembly.

As most clearly illustrated in FIG. 3, the upper flange 10 is of substantially heavier section than flange 9. This relatively heavy section of flange 10 has sufficient rigidity to effectively resist deflection in the amount necessary to withdraw tabs 17 from openings 12. Flange 10 also provides support for the side panel between adjacent tabs 17 on the reinforcing rod member 15. While flange 9 provides some rigidity to the associated side panel, its principal function is to provide support for the rod member 15 to prevent movement thereof in a direction to allow tabs 17 to be withdrawn from openings 12.

I claim:

1. In a milk crate having a bottom panel, integrally formed molded plastic side panels, and means reinforcing said side panels adjacent the top edges thereof, the improvement wherein said reinforcing means comprises, an endless metal reinforcing rod member extending around and closely engaging the outer periphery of said crate adjacent the top edges of said side panels, first retaining means integrally molded on and projecting outwardly from said side panels for engaging and retaining said rod member against movement toward said bottom panel, second retaining means in the form of an outwardly directed flange integrally molded with said side panels and extending outwardly from the top edges thereof in overlaying relation with said rod member, and locking means integrally formed on said rod member engaging one of said retaining means to prevent relative movement of said side panels inwardly away from said rod member.

2. A milk crate as defined in claim 1 wherein said locking means comprises a plurality of tabs integrally formed on and projecting from said endless rod member to engage and penetrate one of said retaining means.

3. A milk crate as defined in claim 1 wherein said first retaining means comprises a flange integrally formed with said side panels and projecting outwardly therefrom in underlying relation with said rod member, said reinforcing means further comprising, a plurality of openings extending through one of said flanges, said locking means including means projecting from said rod member into said openings.

4. A milk crate as defined in claim 1 wherein said bottom panel and said side panels are generally rectangular, and wherein said locking means engages said one of said retaining means at a point intermediate the side edges of each of said panels.

5. In a milk crate having a generally rectangular bottom panel, molded plastic side panels extending upwardly from said bottom panels and integrally joined at the corners of said crate, and means reinforcing said side panels adjacent the top edge thereof, the improvement wherein said reinforcing means comprises an endless metal reinforcing rod member extending around and closely engaging the outer periphery of said crate adjacent the top edges of said side panels, shoulder means integrally molded on and projecting outwardly from said side panels for engaging and retaining said rod member against movement toward said bottom panel, an outwardly directed flange integrally molded with said side panels and extending outwardly from the top edges thereof in overlying relation with said rod member, a plurality of openings formed in said flange, one of said openings being positioned intermediate the side edges of each of said side panels, and a plurality of rigid tab members formed on and projecting upwardly from said rod members, said tabs projecting into said openings in said flange and retaining said side panels against movement away from said rod member.

6. A milk crate as defined in claim 5 wherein said shoulder means comprises a second flange integrally molded with said side panels and extending around said crate in vertically spaced relation with said outwardly directed flange and cooperates therewith to define a channel retaining said rod member against vertical movement on said crate.

7. A milk crate as defined in claim 6 wherein a plurality of said openings are spaced along said flange intermediate the side edges of each of said panels, with one of said tabs projecting into each of said openings, said tabs being generally rectangular in cross-section and being integrally formed on said rod member by coining.

8. In a milk crate having a bottom panel, integrally formed molded plastic side panels, and means reinforcing said side panels adjacent the top edges thereof, the improvement wherein said reinforcing means comprises, means defining a substantially U-shaped channel integrally molded from the same homogenous mass of plastic material with said side panels, said U-shaped channel extending around the outer periphery of said crate adjacent the open top thereof, an endless metal reinforcing rod member extending around and closely engaging the outer periphery of said crate within said U-shaped channel, and locking means integrally formed on said rod member engaging and penetrating the inner surface of at least one of the opposing walls of said U-shaped channel to prevent relative movement between said rod member and said side panels.

9. A milk crate as defined in claim 8 wherein said locking means comprises a plurality of tabs integrally formed on and projecting from said endless rod member to engage and penetrate one of said channel walls.

References Cited

UNITED STATES PATENTS 2,743,030  4/1956  Read.

FOREIGN PATENTS 1,100,401  4/1955  France.

JAMES B. MARBERT, *Primary Examiner.*

U.S. Cl. X.R.

220—94